United States Patent
Jwa et al.

(10) Patent No.: US 8,594,238 B2
(45) Date of Patent: Nov. 26, 2013

(54) APPARATUS AND METHOD FOR ESTIMATING CHANNEL IN CHANNEL DOMAIN

(75) Inventors: Hye-Kyung Jwa, Daejeon-si (KR);
Il-Gyu Kim, Chungcheongbuk-do (KR);
Mu-Yong Shin, Daejeon-si (KR);
Hyung-Cheol Shin, Daejeon-si (KR);
Duk-Hyun You, Seoul (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 383 days.

(21) Appl. No.: 12/967,556

(22) Filed: Dec. 14, 2010

(65) Prior Publication Data

US 2011/0142142 A1   Jun. 16, 2011

(30) Foreign Application Priority Data

Dec. 15, 2009 (KR) .......................... 10-2009-0125129
May 20, 2010 (KE) .......................... 10-2010-0047605

(51) Int. Cl.
*H04L 27/00* (2006.01)
(52) U.S. Cl.
USPC ........................................................ 375/316

(58) Field of Classification Search
USPC .................................. 375/316, 346, 320, 322
See application file for complete search history.

(56) References Cited

U.S. PATENT DOCUMENTS

| | | | |
|---|---|---|---|
| 2004/0184398 A1* | 9/2004 | Walton et al. | 370/203 |
| 2006/0221847 A1* | 10/2006 | Dacosta | 370/252 |
| 2010/0080208 A1* | 4/2010 | Utakouji et al. | 370/343 |
| 2010/0130135 A1* | 5/2010 | Wang et al. | 455/67.11 |
| 2010/0158176 A1* | 6/2010 | Luo et al. | 375/350 |

FOREIGN PATENT DOCUMENTS

| | | |
|---|---|---|
| KR | 10-2008-0033543 | 4/2008 |
| WO | 2007/021952 | 2/2007 |

* cited by examiner

*Primary Examiner* — Kevin M Burd
(74) *Attorney, Agent, or Firm* — Kile Park Reed & Houtteman PLLC

(57) ABSTRACT

A method and apparatus for estimating a channel in a frequency domain are provided. The apparatus acquires frequency selectivity information using a cell-specific reference signal, selects a channel estimation scheme using a user specific reference signal according to the acquired frequency selectivity information, and estimates a frequency channel using the selected channel estimation scheme. Accordingly, more accurate channel estimation with respect to a region to which a physical downstream shared channel is allocated can be performed.

16 Claims, 3 Drawing Sheets

Conventional LTE Downlink Subframe

APPARATUS AND METHOD FOR ESTIMATING CHANNEL IN CHANNEL DOMAIN

CROSS-REFERENCE TO RELATED APPLICATION(S)

This application claims the benefit under 35 U.S.C. §119(a) of Korean Patent Application Nos. 10-2009-0125129, filed on Dec. 15, 2009, and 10-2010-0047605, filed on May 20, 2010, the entire disclosures of which are incorporated herein by references for all purposes.

BACKGROUND

1. Field

The following description relates to channel estimation in a mobile communication system, and more particularly, to an apparatus and method for estimating a channel in a frequency domain.

2. Description of the Related Art

Generally, a mobile communication system employs an orthogonal frequency division multiple access (OFDMA) scheme or a single carrier frequency division multiple access (SC-FDMA) scheme.

Specifically, standards of IEEE 802.16, 802.20 and Wibro systems of a portable Internet system utilize the OFDMA scheme, and a cellular communication system referred to as Long Term Evolution (LTE) of $3^{rd}$ Generation Partnership Project (3GPP) utilizes OFDMA scheme and SC-FDMA scheme.

The communication systems utilizing the OFDMA scheme and the SC-FDMA scheme use cyclic prefix symbols. In this case, to overcome effects from multipath fading, a length of a cyclic prefix symbol is designed to be longer than a length of an impulse response of a channel. In addition, a single tap equalizer is used in a frequency domain to compensate for distortion of the estimated channel. To compensate for distortion of the channel, the channel estimation should be accurate.

SUMMARY

The following description relates to a channel estimation apparatus and method to accurately estimate a channel.

In one general aspect, provided is a method of estimating a channel in a frequency domain, the method including: acquiring frequency selectivity information using a cell-specific reference signal; selecting a channel estimation scheme using a user specific reference signal according to the acquired frequency selectivity information; and estimating a frequency channel using the selected channel estimation scheme.

The method may further include, prior to the acquiring of the frequency selectivity information, estimating a channel frequency response using a cell-specific reference signal; calculating noise signal distribution using the estimated channel frequency response; and calculating a signal-to-noise ratio (SNR) of a specific resource block (RB) using the estimated channel frequency response and the calculated noise signal distribution.

In another general aspect, provided is an apparatus for estimating a channel in a frequency domain, the apparatus including: a frequency selectivity acquisition unit configured to acquire frequency selectivity information of a reception signal; and a channel estimation unit configured to select a channel estimation scheme for a part of bandwidth of the reception signal according to the frequency selectivity information acquired by the frequency selectivity acquisition unit and estimate a channel frequency response using the selected channel estimation scheme.

The channel estimation unit may be further configured to comprise a reference frequency estimation unit configured to estimate a channel frequency response using a cell-specific reference signal, and the frequency selectivity acquisition unit is further configured to comprise: a noise signal distribution calculation unit configured to calculate noise signal distribution using the channel frequency response estimated by the reference frequency estimation unit; and a signal-to-noise ratio (SNR) calculation unit configured to calculate an SNR of a specific resource block (RB) using the channel frequency response estimated by the reference frequency estimation unit and the noise signal distribution calculated by the noise signal distribution calculation unit.

Other features and aspects will be apparent from the following detailed description, the drawings, and the claims.

Figure 1:
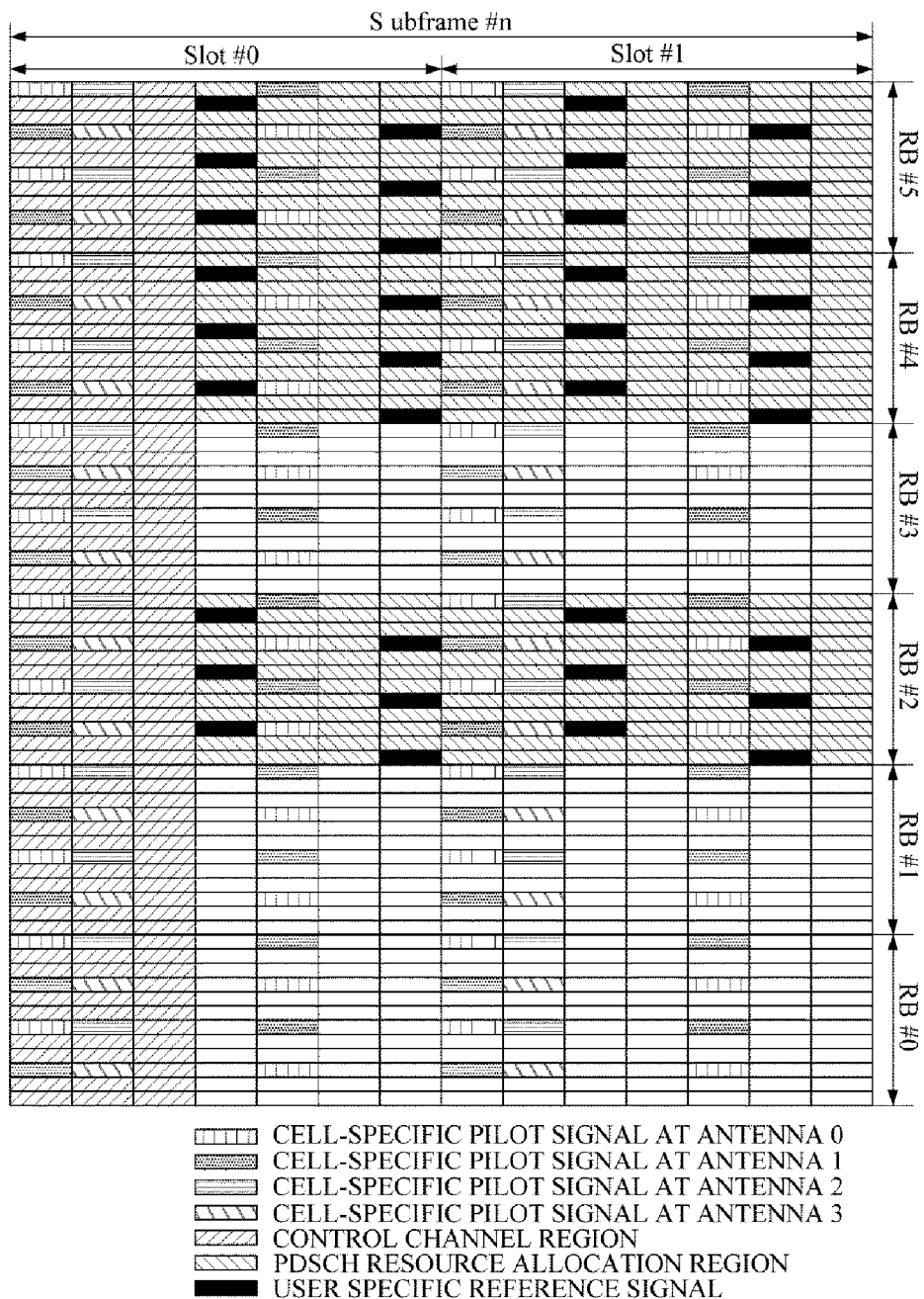
FIG. 1 is a diagram illustrating an example of a downlink sub frame structure in a long term evolution (LTE) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a diagram of an example of a downlink sub frame structure in a long term evolution (LTE) system. Referring to FIG. 1, in the LTE system, a cell-specific reference signal is allocated within one sub frame. The cell-specific reference signal is used to demodulate physical channels other than physical downlink shared channels (PDSCHs) by estimating a wireless channel with respect to system bandwidth.

In addition, when a data transmission mode of a downlink is a beam forming mode, a user specific reference signal may be additionally allocated within a resource block (RB) through which a PDSCH is transmitted so as to obtain user specific wireless channel information.

As shown in FIG. 1, a system bandwidth includes six RBs. Each RB includes twelve subcarriers, and in an LTE system, each RB has a bandwidth of 180 kHz. The system bandwidth is capable of accommodating 110 RBs, at maximum, and a 20-MHz system. In the case of a general cyclic prefix (CP) form, one subframe has fourteen orthogonal frequency division multiplexing (OFDM) symbols along a time axis.

The cell-specific reference signal is allocated in consideration of four transmission antennas at maximum, and a frequency interval of the signal is an interval of six (K) subcarriers. The user specific reference signal may be allocated only within an RB to which the PDSCH is allocated, and a frequency interval of the signal may be an interval of three ($K_{UE}$) subcarriers.

Figure 2:
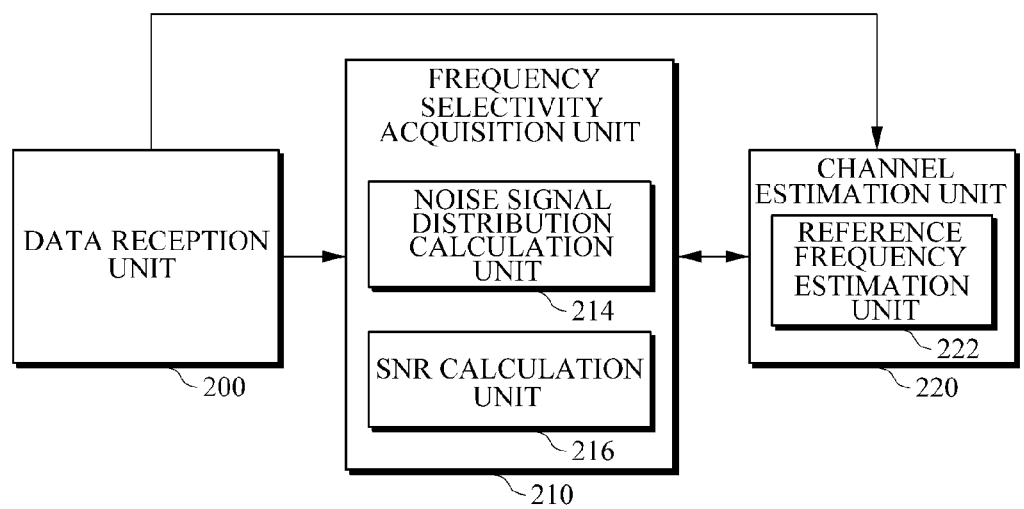
FIG. 2 is a diagram illustrating an example of a channel estimation apparatus.

FIG. 2 illustrates a diagram of an example of a channel estimation apparatus. As shown in FIG. 2, the channel estimation apparatus may include a data reception unit 200, a frequency selectivity acquisition unit 210, and a channel estimation unit 220.

The data reception unit 200 may include a plurality of antennas, and receive data transmitted through an orthogonal frequency division multiple access (OFDMA) scheme. In the above example, the data reception unit 200 may sample a radio frequency (RF) band signal received through a reception antenna, convert the RF band signal into a baseband signal, and remove a CP. Then, the data reception unit 200 may transform a series signal from which the CP has been removed into a parallel signal and transform the parallel signal into a data symbol signal within a frequency domain by means of a fast Fourier transform (FFT).

The frequency selectivity acquisition unit 210 may acquire frequency selectivity of each data received by the data reception unit 200.

More specifically, the frequency selectivity acquisition unit 210 may include a noise signal distribution calculation unit 214 and a signal-to-noise ratio (SNR) calculation unit 216.

The noise signal distribution calculation unit 214 may calculate noise signal distribution using channel frequency response estimated by a reference frequency estimation unit 222. In the example, the noise signal distribution calculation unit 214 may use a minimum mean square error (MMSE) algorithm to represent the noise signal distribution as in Equation 1 below.

$$\sigma^2 = \frac{1}{MP_{tx}P_{rx}} \sum_{P_{rx}=0}^{P_{rx}-1} \sum_{P_{tx}=0}^{P_{tx}-1} \sum_{k=0}^{M-1} |Y_{cell}^{P_{rx}}(k) - \tilde{H}^{(P_{rx},0)}(K \cdot k) \cdot X^{P_{rx}}(k)|^2 \quad (1)$$

Here, $X^{P_{tx}}(k)$ represents a transmission signal of the $k^{th}$ cell-specific reference signal of the $P_{tx}^{th}$ transmission antenna. $P_{tx}$ represents the number of transmission antennas, and $P_{rx}$ represents the number of reception antenna.

For example, when a reception signal excluding a guard band is $\{Y^{P_{rx}}(k)\}_{k=0}^{KM-1}$, channel estimation may be performed using various channel estimations schemes based on M cell-specific reference signals, $\{Y_{cell}^{P_{rx}}(k)\}_{k=0}^{M-1}$.

For example, a temporary channel frequency response is calculated using a least square (LS) scheme. Then, a channel frequency response, $\{\tilde{H}^{(P_{rx},P_{tx})}(k)\}_{k=0}^{KM-1}$, between the $P_{tx}^{th}$ transmission antenna and the $P_{rx}^{th}$ reception antenna with respect to K·M subcarriers is calculated using a known channel estimation algorithm based on the temporary channel frequency response. In this case, the channel estimation algorithm may be linear interpolation or FFT interpolation.

The SNR calculation unit 216 may use the channel frequency response estimated by the reference frequency estimation unit 222 and the noise signal distribution calculated by the noise signal distribution calculation unit 214 to calculate a SNR of a specific RB, for example, the $m^{th}$ RB, using Equation 2 below.

$$SNR_m = \frac{1}{12\sigma^2} \sum_{P_{rx}=0}^{P_{rx}-1} \sum_{k=12m}^{12m+11} |\tilde{H}^{(P_{rx},0)}(k)|^2, \quad (2)$$

$$m = 0, \ldots, (KM/12 - 1)$$

In addition, the SNR ratio calculation unit 216 may calculate an average of the SNRs with respect to the entire bandwidth using Equation 3 below.

$$SNR_S = \frac{1}{KM\sigma^2} \sum_{P_{rx}=0}^{P_{rx}-1} \sum_{k=0}^{KM-1} |\tilde{H}^{(P_{rx},0)}(k)|^2 \quad (3)$$

The channel estimation unit 220 may select a channel estimation scheme for a part of bandwidth of a reception signal according to the frequency selectivity acquired by the frequency selectivity acquisition unit 210, and estimate channel frequency response using the selected channel estimation scheme.

The reference frequency estimation unit 222 may estimate a channel frequency response using a cell-specific reference signal.

The channel estimation unit 220 may determine the frequency selectivity as being small when a difference between the SNR of a specific RB, which is calculated by the SNR calculation unit 216, and the average SNR ratio is smaller than a certain value, and select linear interpolation as the channel estimation scheme for the corresponding RB. Alternatively, if the difference between the SNR of a specific RB and the average SNR is greater than the certain value, the channel estimation unit 220 may select FFT interpolation as the channel estimation scheme.

In the above example, if RBs having a PDSCH allocated thereto occur consecutively, the channel estimation unit 220 obtains a temporary frequency response according to the LS scheme by taking into consideration the number of consecutive RBs, performs an inverse FFT (IFFT) on the temporary frequency response to extract an effective impulse response, and performs an FFT on the extracted effective impulse response to acquire a channel frequency response. The channel estimation unit 220 determines the exponent of 2 ($2^n$) which is greater than the product of the number of subcarriers included in an RB and the number of the consecutive RBs, and obtains a temporary frequency response according to the LS scheme using the determined exponent of 2.

In contrast, if PDSCH resource allocation is inconsecutively performed, the channel estimation unit 220 may be required to perform FFT interpolation on each region at which the PDSCH resource is allocated consecutively within a system bandwidth. For example, as shown in FIG. 1, the PDSCH resource allocation is performed on a total of three RBs, RB#2, RB#4, and RB#5, wherein the PDSCH resource allocation is performed consecutively on the RBs RB#4 and RB#5 and inconsecutively on the remaining RB RB#2. In this case, FFT interpolation is performed on both consecutive RBs RB#4 and RB#5, and FFT interpolation is separately performed on the remaining RB RB#2.

As described above, by performing channel estimation using the cell-specific reference signal and the user specific reference signal, the channel estimation with respect to a region to which the PDSCH is allocated can be performed more accurately.

Figure 3:
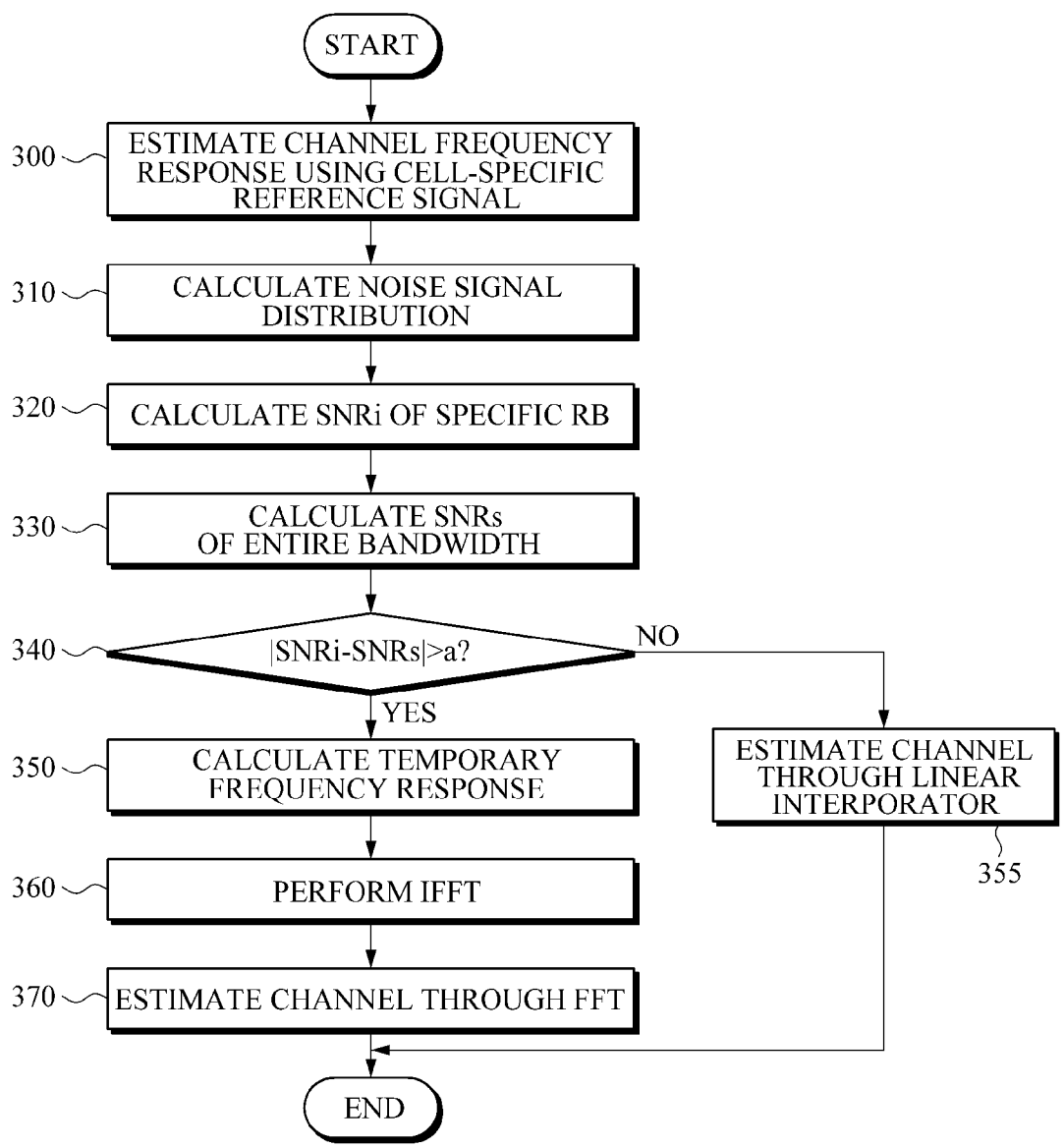
FIG. 3 is a flowchart illustrating an example of a channel estimation method.

FIG. 3 illustrates a flowchart of an example of a channel estimation method. First, signals transmitted from a plurality of transmission antennas Antenna 0, ..., and Antenna $P_{tx}-1$ through a wireless channel are received by a plurality of reception antennas Antenna 0, ..., and Antenna $P_{rx}-1$.

An RF band signal received by the reception antenna is sampled to transform a baseband signal, and a CP is removed from the baseband signal. Then, a series signal from which the CP is removed is transformed into a parallel signal, and the parallel signal is transformed into a data symbol signal within a frequency domain by means of an FFT. In addition, when a reception signal excluding guard band is represented as $\{Y^{P_{rx}}(k)\}_{k=0}^{KM-1}$, channel estimation may be performed using various channel estimation schemes based on M cell-specific reference signals $\{Y_{cell}^{P_{rx}}(k)\}_{k=0}^{M-1}$ (300).

For example, the LS scheme may be used to obtain a temporary channel frequency response. Then, a channel frequency response, $\{\tilde{H}^{(P_{rx},P_{tx})}(k)\}_{k=0}^{KM-1}$, between the $P_{tx}^{th}$ transmission antenna and the $P_{rx}^{th}$ reception antenna with respect to K carriers and M carriers is calculated using a known channel estimation algorithm based on the temporary channel frequency response. In this case, the channel estimation algorithm may be linear interpolation or FFT interpolation.

By using the calculated channel frequency response and the reception signal, noise signal distribution is obtained (310). For example, the noise signal distribution may be acquired utilizing an MMSE algorithm as in Equation 4 below.

$$\sigma^2 = \frac{1}{MP_{tx}P_{rx}} \sum_{P_{rx}=0}^{P_{rx}-1} \sum_{P_{tx}=0}^{P_{tx}-1} \sum_{k=0}^{M-1} |Y_{cell}^{P_{rx}}(k) - \tilde{H}^{(P_{rx},0)}(K \cdot k) \cdot X^{P_{rx}}(k)|^2 \quad (4)$$

Here, $X^{P_{tx}}(k)$ represents a transmission signal of the $k^{th}$ cell-specific reference signal of to the $P_{tx}^{th}$ transmission antenna. $P_{tx}$ represents the number of transmission antennas, and $P_{rx}$ represents the number of reception antenna.

Then, an SNR ($SNR_m$) with respect to the $m^{th}$ RB may be obtained by Equation 5 as below using the channel frequency response obtained from the cell-specific reference signal and the acquired noise signal distribution (320).

$$SNR_m = \frac{1}{12\sigma^2} \sum_{P_{rx}=0}^{P_{rx}-1} \sum_{k=12m}^{12m+11} |\tilde{H}^{(P_{rx},0)}(k)|^2, \quad (5)$$

$$m = 0, \ldots, (KM/12 - 1)$$

In addition, the average SNR ($SNR_S$) with respect to the entire system bandwidth may be obtained by Equation 6 as below (330).

$$SNR_S = \frac{1}{KM\sigma^2} \sum_{P_{rx}=0}^{P_{rx}-1} \sum_{k=0}^{KM-1} |\tilde{H}^{(P_{rx},0)}(k)|^2 \quad (6)$$

In the above example, an SNR of $0^{th}$ transmission antenna may be taken as a reference SNR.

The channel estimation is performed using a user specific reference signal according to a PDSCH resource allocation scheme and an SNR per RB.

In this case, when the number of RBs to which a PDSCH is allocated is $M_{pdsch}$, a difference $D_i$ between the average SNR with respect to the entire system bandwidth and the SNR of an RB to which a PDSCH is allocated may be defined as Equation 7 below.

$$D_i = |SNR_i - SNR_S|, i = 0, \ldots, M_{pdsch} - 1 \quad (7)$$

When the difference Di between the average SNR with respect to the entire system bandwidth and the SNR of an RB to which a PDSCH is allocated is smaller than 2 to 3 dB (Di=2 to 3, all i) (340), it indicates that the frequency selectivity is not substantially large. Thus, as a scheme for channel estimation in a frequency domain through a user specific reference signal, linear interpolation is used (355).

In contrast, when the difference Di between the average SNR with respect to the entire system bandwidth and the SNR of an RB to which a PDSCH is allocated is greater than 2 to 3 dB (Di>2 to 3, any i) (340), it indicates that the frequency selectivity is large. Hence, FFT interpolation, which has a superior performance when frequency selectivity is large, is used.

Specifically, when PDSCH resource allocation is performed consecutively, the exponent of 2 which is greater than $12 \cdot M_{pdsch}$ that is a size of an IFFT to be used for FFT interpolation is determined. A temporary frequency response is obtained by performing the LS scheme on the position to which the actual user specific reference signal is allocated using the determined exponent of 2 (350). Then, the temporary frequency response is transformed into a temporal domain through an IFFT to extract an effective impulse response (360). Then, an FFT is performed on the effective impulse response to obtain channel responses in a frequency domain corresponding to $12 \cdot M_{pdsch}$ (370).

If PDSCH resource allocation is inconsecutively performed, the channel estimation unit 220 is required to perform FFT interpolation on each region at which the PDSCH resource is allocated consecutively within a system bandwidth. For example, as shown in FIG. 1, the PDSCH resource allocation is performed on a total of three RBs, RB#2, RB#4, and RB#5, wherein the PDSCH resource allocation is performed consecutively on the RBs RB#4 and RB#5 and inconsecutively on the remaining RB RB#2. In this case, FFT interpolation is performed on both consecutive RBs RB#4 and RB#5, and FFT interpolation is separately performed on the remaining RB RB#2.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a channel in a frequency domain, the method comprising:
   estimating a channel frequency response using a cell-specific reference signal;
   calculating a noise signal distribution using the estimated channel frequency response;
   calculating a signal-to-noise ratio (SNR) of a specific resource block (RB) using the estimated channel frequency response and the calculated noise signal distribution;
   calculating an average SNR with respect to the entire bandwidth;
   selecting a channel estimation scheme based on a comparison of the calculated SNR of the specific RB to the calculated average SNR; and
   estimating a frequency channel using the selected channel estimation scheme.

2. The method of claim 1, wherein the selecting of the channel estimation scheme comprises selecting linear interpolation as the channel estimation scheme of the specific RB when a difference between the calculated SNR of the specific RB and the calculated average SNR is smaller than a previously set value.

3. The method of claim 1, wherein the selecting of the channel estimation scheme comprises selecting fast Fourier transform (FFT) interpolation as the channel estimation scheme of the specific RB when a difference between the calculated SNR of the specific RB and the calculated average SNR is greater than a previously set value.

4. The method of claim 3, wherein the estimating of the frequency channel comprises:
   when a physical downlink shared channel (PDSCH) is allocated to consecutive RBs, obtaining a temporary frequency response according to a least square (LS) scheme by taking into consideration the number of the consecutive RBs;
   extracting an effective impulse response by performing an inverse FFT (IFFT) on the temporary frequency response; and
   obtaining a channel frequency response by performing an FFT on the effective impulse response.

5. The method of claim 4, wherein the obtaining of the temporary frequency response comprises:
   determining the exponent of 2 that is greater than the product of the number of subcarriers included in an RB and the number of the consecutive RBs; and
   obtaining the temporary frequency response according to the LS scheme using the determined exponent of 2.

6. The method of claim 1, wherein the specific RB is a resource block to which a physical downlink shared channel (PDSCH) is allocated.

7. The method of claim 1, wherein the calculating of the noise signal distribution comprises performing a minimum mean square error (MMSE) algorithm.

8. An apparatus for estimating a channel in a frequency domain, the apparatus comprising:
   a channel estimation unit configured to estimate a channel frequency response using a cell-specific reference signal; and
   a frequency selectivity acquisition unit configured to:
      calculate a noise signal distribution using the estimated channel frequency response;
      calculate a signal-to-noise ratio (SNR) of a specific resource block (RB) using the estimated channel frequency response and the calculated noise signal distribution; and
      calculate an average SNR with respect to the entire bandwidth,
   wherein the channel estimation unit is also configured to:
      select a channel estimation scheme based on a comparison of the calculated SNR of the specific RB to the calculated average SNR; and
      estimate a frequency channel using the selected channel estimation scheme.

9. The apparatus of claim 8, wherein the channel estimation unit comprises a reference frequency estimation unit configured to estimate the channel frequency response using the cell-specific reference signal, and
   wherein the frequency selectivity acquisition unit comprises:
      a noise signal distribution calculation unit configured to calculate the noise signal distribution using the channel frequency response estimated by the reference frequency estimation unit; and
      an SNR calculation unit configured to calculate the SNR of the specific RB using the channel frequency response estimated by the reference frequency estimation unit and the noise signal distribution calculated by the noise signal distribution calculation unit.

10. The apparatus of claim 9, wherein the SNR calculation unit is further configured to calculate the average SNR with respect to the entire bandwidth.

11. The apparatus of claim 8, wherein the channel estimation unit is further configured to determine that frequency selectivity is small when a difference between the calculated SNR of the specific RB and the calculated average SNR is smaller than a previously set value, and select linear interpolation as the channel estimation scheme for the specific RB.

12. The apparatus of claim 8, wherein the channel estimation unit is further configured to determine that frequency selectivity is large when a difference between the calculated SNR of the specific RB and the calculated average SNR is greater than a previously set value, and select fast Fourier transform interpolation as the channel estimation scheme for the specific RB.

13. The apparatus of claim 12, wherein when physical downlink shared channel (PDSCH) is allocated to consecutive RBs, the channel estimation unit is further configured to obtain a temporary frequency response according to a least square (LS) scheme by taking into consideration the number of the consecutive RBs, extract an effective impulse response by performing an inverse fast Fourier transform (IFFT) on the temporary frequency response, and acquire a channel frequency response by performing fast Fourier transform on the extracted effective impulse response.

14. The apparatus of claim 13, wherein the channel estimation unit is further configured to determine the exponent of 2 that is greater than the product of the number of subcarriers included in an RB and the number of the consecutive RBs and obtain the temporary frequency response according to the LS scheme using the determined exponent of 2.

15. The apparatus of claim 8, wherein the specific RB is an RB to which a physical downlink shared channel (PDSCH) is allocated.

16. The apparatus of claim 9, wherein the noise signal distribution calculation unit is further configured to use a minimum mean square error (MMSE) algorithm to calculate the noise signal distribution.

* * * * *